United States Patent [19]

Trimble

[11] 3,745,462

[45] July 10, 1973

[54] MOBILE RADIO EXTENSION INTERFACE FOR CONVERTING CONVENTIONAL TRANSMIT/RECEIVE TO A REPEATER

[75] Inventor: Melvin Earl Trimble, Saratoga, Calif.

[73] Assignee: Public Systems Inc., Sunnyvale, Calif.

[22] Filed: Jan. 20, 1972

[21] Appl. No.: 219,247

[52] U.S. Cl. .......................... 325/22, 325/4, 325/16, 325/18, 325/21, 325/53, 325/55, 325/57, 325/64

[51] Int. Cl. .......................... H04b 1/48

[58] Field of Search .......................... 325/2–8, 325/16–18, 21, 22, 53, 55, 57, 64

[56] References Cited

UNITED STATES PATENTS

| | | | |
|---|---|---|---|
| 3,449,750 | 6/1969 | Sweigert | 325/64 |
| 2,731,622 | 1/1956 | Doremus et al. | 325/57 |
| 2,734,131 | 2/1956 | Magnuski | 325/6 |
| 3,254,159 | 5/1966 | Condict | 325/22 |
| 3,217,254 | 11/1965 | Hughes et al. | 325/55 |

*Primary Examiner*—Albert J. Mayer
*Attorney*—Karl A. Limbach, Thomas A. Gallagher et al.

[57] ABSTRACT

A unit connectable to a conventional transmitter and receiver to convert them for use as a repeater or transponder with provision for automatically inhibiting multiple transmissions by units within range of one another. The unit is particularly useful for using a mobile transceiver as a repeater to form communications links in both directions between a base station and a hand held portable unit in the proximity of the mobile transceiver.

11 Claims, 5 Drawing Figures

MOBILE RADIO EXTENSION INTERFACE FOR CONVERTING CONVENTIONAL TRANSMIT/RECEIVE TO A REPEATER

BACKGROUND OF THE INVENTION

The invention relates to two-way communications systems and more particularly to a system permitting remote use of a mobile transceiver. While the invention is particularly useful for law enforcement and is described herein in such applications, it will be apparent that the invention is equally useful in other two-way radio services.

A police officer in a car relies on his mobile radio for virtually all of his contact with command and support activities. However, the nature of the officer's work prevents him from being able to obtain maximum use from this equipment. When the officer leaves the car to carry out an assignment, he is out of contact for long periods and is unable to communicate with the dispatcher or with other officers.

The out-of-car communications needs for an officer range from situations where a quick communication response is necessary or possibly even critical to the safety of the officer to situations where it is inconvenient for the officer to return to his car to transmit or receive information. The requirements include both talk-in and talk-out needs.

The most important out-of-car situation requiring a communications capability is when an officer's personal safety is endangered. The sudden attack on an officer or the routine assignment which turns into something more serious demands immediate action. Presently response must wait until the officer can return to his car and call for help.

When an officer is away from his car handling an incident and needs additional support, he must leave the scene to ask for assistance. Leaving an emergency in progress can be very undesirable or even impossible. The patrol officer frequently handles assignments in which there is a serious medical condition resulting from vehicular or household accidents, crimes of violence, and other circumstances. Often in these situations the officer must provide first-aid and other support while at the same time needs to request support services such as ambulances, etc. Since he must return to the car to communicate, it must, of necessity, result in slower response times for the service agencies to respond.

The police community is coming to rely more and more on criminal justice information systems to help in the apprehension of criminals. There is an increasing availability of computer systems for checking people, cars, and other property. When the officer is in a dynamic situation away from his car, he cannot direct inquiries back through the dispatch center to the various criminal justice information systems without returning to his car (and possibly disengaging himself from the situation). Also, for the inquiry to be useful, the officer must remain at the car in order to hear the response.

Once the officer has requested police support or additional services, he is unable to receive any confirmation unless he remains in the vicinity of the patrol car. If he must leave the car the dispatcher is helpless to provide any information about the nature of the response to the request.

The most serious aspect of this problem is that while the officer is out of the car he is not able to receive information regarding potentially dangerous persons or events in his area. The lack of this capability can have fatal consequences.

Once the officer has left the car to carry out an assignment, he is no longer under the control of his superiors until he calls in for his next assignment. If an officer is given multiple assignments, the problem is even more acute. The loss of contact is for much longer periods of time during which higher priority service calls may arise in the officer's areas, but he can't be reached to be reassigned.

The dynamics of traffic control and traffic management may require several calls from the officer to the dispatcher requesting services. It is clear, however, that while the officer is managing traffic situations, he is not able to return to his car to communicate, thus, the situation can deteriorate while he is engaged in communications.

Efficient use of police in area searches is seriously downgraded by the fact that the officer must return to the car to make an inquiry or to report information. Quite often this may involve transit of considerable distances and thus degrade the operation.

Operationally, officers on stakeout or other surveillance assignments need both the capability to reach the dispatcher when they wish and to converse between themselves without cluttering the primary dispatch channel.

In order to provide suitable out-of-car communications a lightweight hand held transceiver is desirable. Since such units necessarily have low power transmitters and relatively insensitive receivers they must work through a repeater or transponder in order to communicate with a base station.

There have been many attempts made to develop equipment to fill the communication gap which exists when the officer leaves his car; however, none of them have provided inexpensive, highly reliable two-way continuous communication capability.

In one approach, fixed repeaters are placed on towers or high-rise buildings in a grid network and the officers are equipped with transceivers which transmit to the repeaters. Fixed transmitters or hardwire lines are used to deliver the signal to the base station. One example of such a system is in U.S. Pat. No. 2,883,522 to A. Brosh. Installation of such a repeater network involves acquisition of new equipment which includes sophisticated electronic "voting" systems in order to continually choose the best signal received at the repeaters in the vicinity of the officer's transceiver. Performance varies according to distance from the repeater, interference in the path between the transceiver and the repeater, number of repeaters involved, etc. The hand held transceivers in such a system must be powerful enough to reach the nearest repeater, which may be a mile or more distant. In order to provide for man-to-man communications on the scene without using the repeater channel a second frequency in the hand unit must be provided, but the second frequency will still transmit on the higher power, which may be undesirable in many surveillance situations. Such a system is more susceptible to electronic "jamming." With large numbers of portables in service, each of which provides a means of capturing the communications channel, it is an easy matter to steal a portable and hold the switch down, thereby taking over the channel. A repeater system is subject to two types of physical vulnerability which with problems of civil disturbances, etc., may be of paramount consideration. If the repeater system employs a hardwire link between the repeater and the base station, this is subject to destruction or being cut. In addition, the permanent repeater towers are, of course, vulnerable to attack and destruction.

A further approach uses vehicular repeater systems. Vehicular repeater systems which are available on the market today (other than mobile radio extension systems) are generally built up from standard mobile radio units which are used as repeaters attached to the vehicles' radios. To prevent nearby cars from jamming each other in picking up a signal from an officer's hand unit, these systems may either employ operational coordination or "matched pairs" as ways of preventing radio interference. Where the car retransmission interference problem is handled by turning off all cars except one in a given operation, it requires considerable coordination to set up just one car as a repeater. All other cars in the area must be controlled by the dispatcher's coordination in order to insure that no other car within range is able to pick up the signal and transmit it. If the car retransmission interference problem is handled by means of matching the hand unit to a car unit, it will mean that none of the systems are interchangeable and there will be serious operational limitations on the use of the equipment. For example, constant check must be made to assure that the officer has the right hand unit for the right car. Furthermore, when a car is out of commission for repair service, the hand unit is accordingly out of operation. It is also apparent that an officer can never make use of another car in the vicinity as a repeater.

Various attempts have been made in the prior art to overcome the problem of multiple repeater seizure, i.e., a single transmitter accessing two or more repeaters simultaneously and thus creating interference among the repeaters. In the Brosh patent mentioned herein before the signal strength of the mobile station at each transponder controls the time of a delay relay so that the carrier goes on only at the transponder receiving the strongest signal. That carrier then inhibits the carriers of the other transponders. In U.S. Pat. No. 2,731,622 to J. A. Doremus et al remote unattended stations are prevented from simultaneously transmitting by a scheme whereby a station makes a short preliminary test transmission and then listens briefly for other signals before transmitting. The listening intervals are varied among the stations to inhibit multiple transmissions even when the test transmissions are begun simultaneously. Further approaches are described in U.S. Pat. No. 2,671,167 to J. K. Kulansky and U.S. Pat. No. 2,932,729 to S. Yamato et al. In the Kulansky patent there is provision for the selective calling of a mobile station (A) by a central station (C) through the use of out of voice band tones. Each non-called station is prevented from transmitting until a further tone is transmitted indicating the end of the communication between A and C. Yamato is directed to multiple units accessing a single master station, however, no means is provided to prevent a dual seizure. Interference is prevented once a single station has been recognized by the master station.

SUMMARY OF THE INVENTION

In accordance with the teachings of the present invention a "mobile radio extension" or interface unit having its own transmitter and receiver is provided for use in conjunction with a conventional two-way mobile transceiver and a hand held or portable unit. Provision is made for using the mobile transceiver as a repeater for a base station to portable station link and as a repeater for a portable station to base station link. Means are provided to prevent seizure of more than one mobile transceiver within range of a portable unit in the base station to portable station link mode and to prevent seizure of more than one mobile transceiver by the portable unit in the portable station to base station link mode. In addition, means are provided to permit portable to portable communication without accessing the main mobile to base station channel while inhibiting the establishment of an interference producing base station to portable station link. According to the present invention when more than one mobile transceiver is within range to act as a repeater, one unit is chosen at random and all other units in the area are inhibited. The repeater chosen may change from transmission to transmission depending on the automatic selection process.

Since the mobile transceiver in the vehicle is used as a transponder or repeater, the hand held or portable unit only requires sufficient power to reach the vehicle. Typically a quarter mile range is more than adequate. Thus the hand unit only requires a very low power transmitter, a relatively poor antenna and a relatively insensitive receiver and hence, may be quite small, lightweight and inexpensive. The portable unit is thus conducive to hand held use by a law enforcement officer.

By use of the existing mobile transceiver additional capital outlay for additional repeaters is not necessary. The transmitter and receiver in the mobile radio extension unit is low powered and relatively inexpensive in contrast to a mobile transceiver or a fixed transponder. Moreover, jamming of this system would require the cooperation of a mobile transceiver.

Provision is also made for portable to portable "simplex" operation without involving the mobile transceiver as a repeater.

The use of the present system in a law enforcement communications network provides many advantages. It increases the protection provided officers when they leave their cars to carry out an assignment by enabling them to stay in constant contact with the dispatch center and other officers. It reduces the time involved in getting needed resources, police and others, to the scene to aid the attending officer, by giving him the ability to communicate to the dispatcher on demand. Further, the system reduces the amount of time an officer spends going back and forth to the patrol car in order to communicate with the dispatch center. In addition, it enables the dispatch center to transmit warnings, general information, record check information, etc., as the need arises rather than having to wait for the officer to call in and it increases the effective strength of the patrol force by insuring that all officers are more readily available.

Although the present invention is described primarily with respect to a two-way communications system for public law enforcement use and the like, it will be apparent that the invention is equally applicable to other two-way radio services and particularly to repeater systems in general wherein the problem of multiple seizure arises.

DESCRIPTION OF THE PREFERRED EMBODIMENTS

Figure 1:
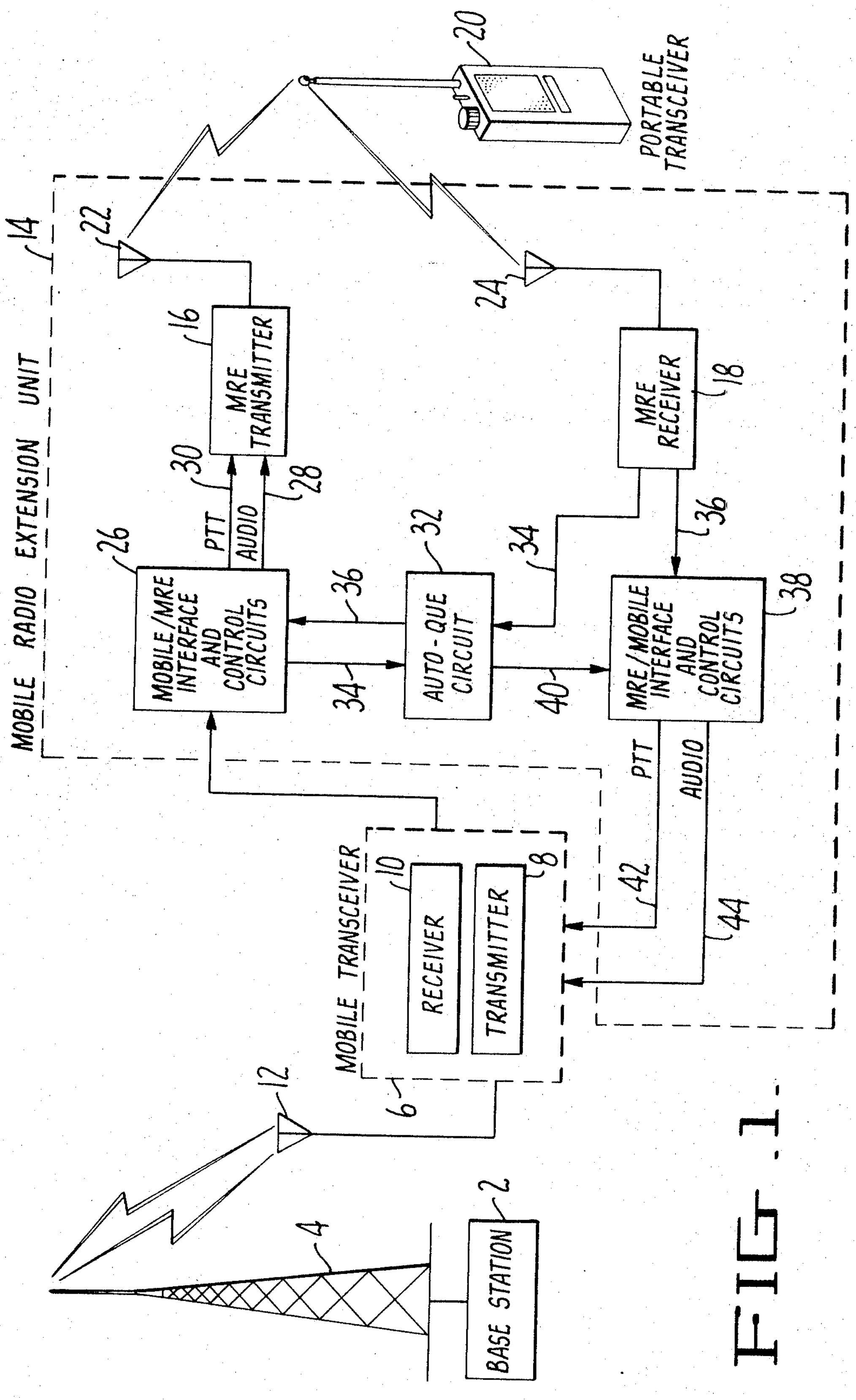
FIG. 1 is a block diagram of the overall communications system including the mobile radio extension unit.

Referring now to FIG. 1 of the drawings wherein a block diagram of the overall two-way communications system employing the present invention is shown. A base station 2, including a conventional transmitter and receiver, radiates and receives signals on a conventional antenna 4. In the present example transmission and reception is made on the same frequency $f_1$ although split frequencies may be employed if additional equipment is used. Although any type of modulation may be employed, in this example frequency modulation is used. A mobile transcevier 6, which is also conventional, includes a transmitter 8 and a receiver 10 that transmit and receive the frequency $f_1$ on a mobile antenna 12. A mobile radio extension unit 14 operates in conjunction with the mobile transceiver 6 and will typically be physically located in close proximity thereto. For example, both the transceiver 6 and unit 14 may be located in a vehicle.

The mobile radio extension (MRE) unit 14 includes an MRE transmitter 16 and an MRE receiver 18 that are interfaced with the mobile transceiver 6 and which communicate with a portable transceiver 20 on a frequency $f_2$ using frequency modulation, although any other type of modulation may be used. The MRE transmitter 16 and receiver 18 may either employ separate antennas 22 and 24, as shown, or alternately may use a single antenna with switching as described below.

The mobile receiver 10 is connected to mobile/MRE interface and control circuits unit 26 in the MRE unit 14. Audio from the receiver 10 is connected to the MRE transmitter 16 via line 28. A push-to-talk (PTT) or transmitter control line 30 is actuated at appropriate times by the control circuits as will be explained below.

Figure 2:
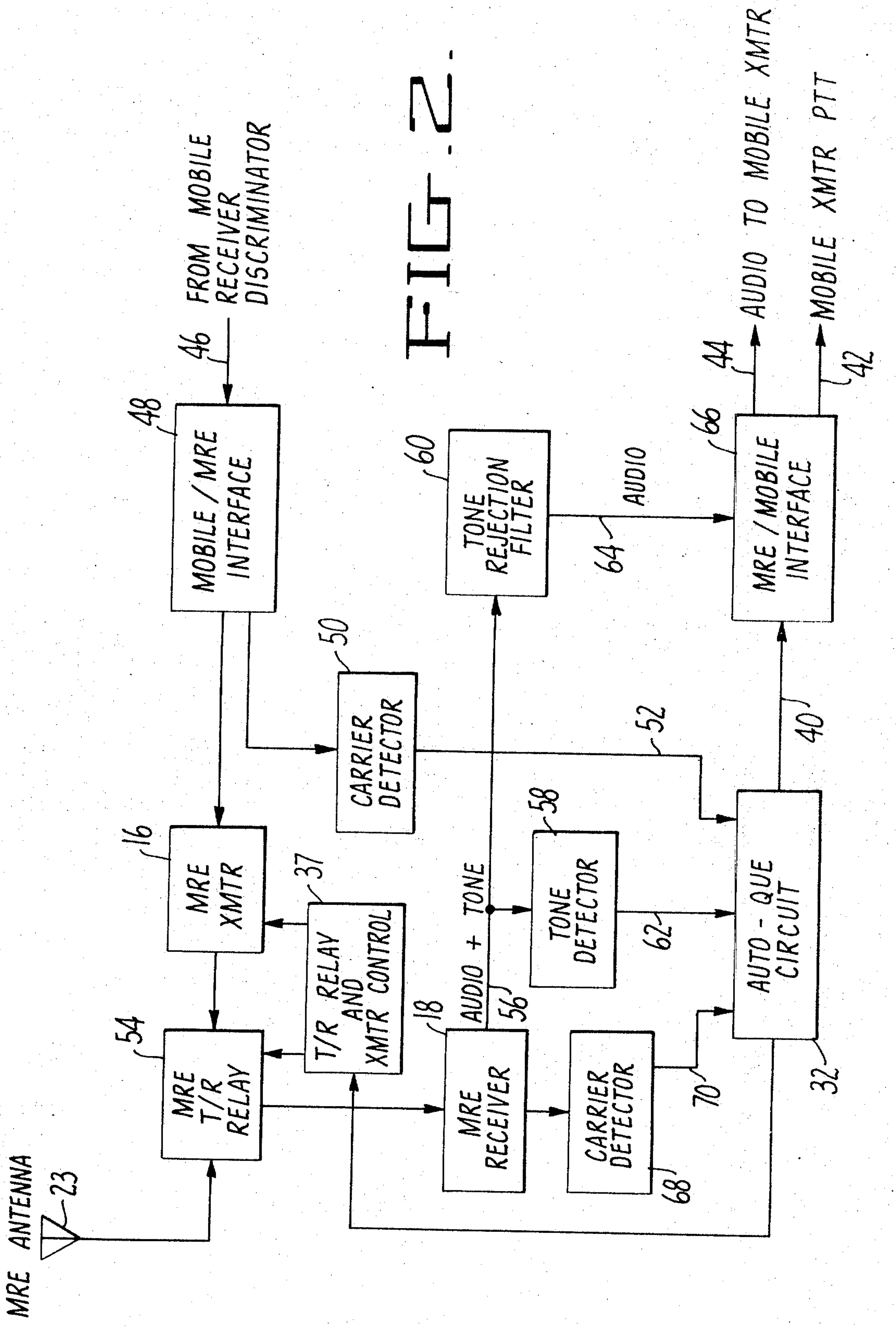
FIG. 2 is a block diagram of the mobile radio extension unit.
Figure 3:
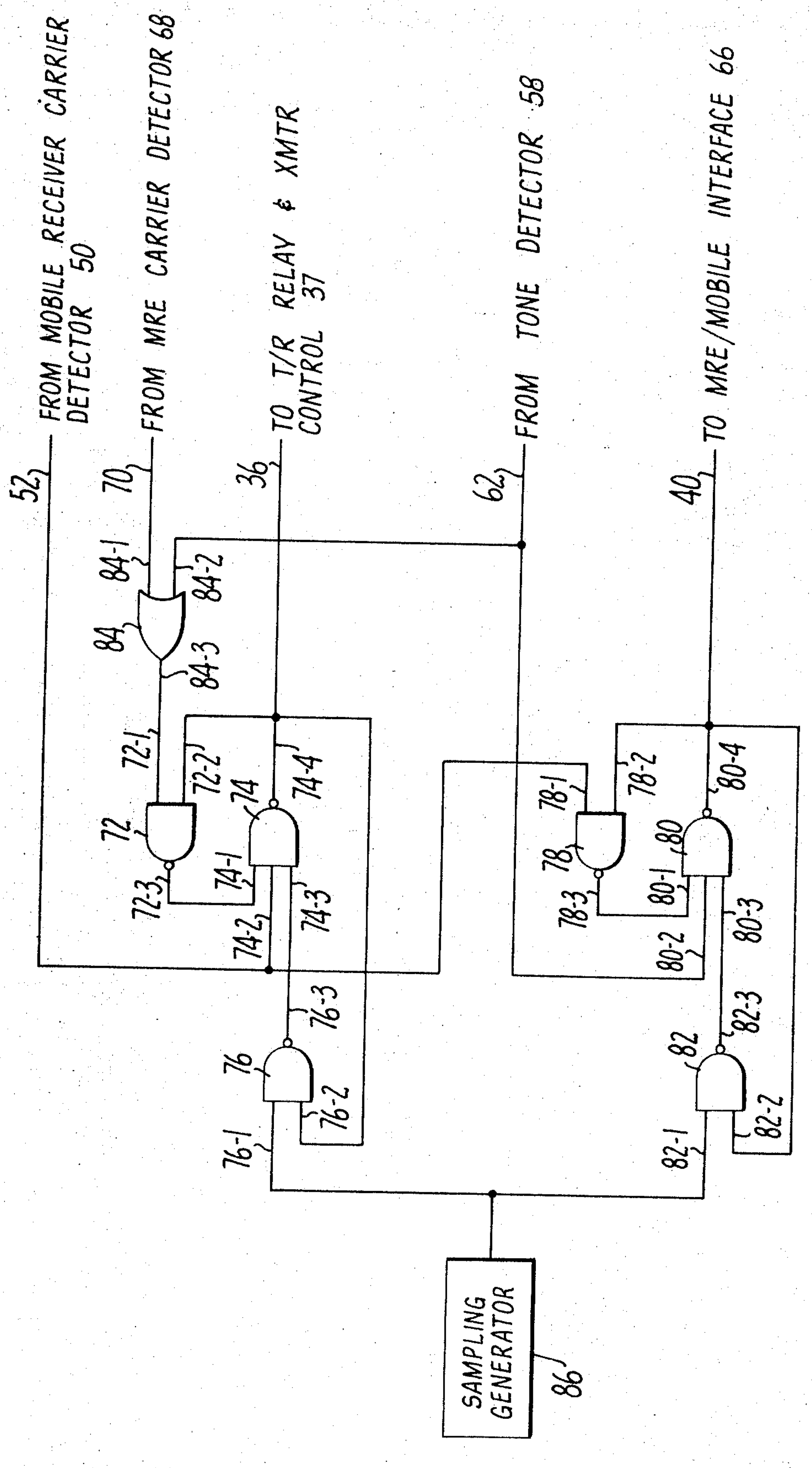
FIG. 3 is a schematic diagram of the auto-que portion of the mobile radio extension unit.

An auto-que circuit 32, which will be described in greater detail with respect to FIGS. 2 and 3, is connected to the interface 26 by line 34 and provides control signals on line 36 for actuating the MRE transmitter 16 thereby completing a communications link from the base atation 2 to the portable transceiver 20.

The MRE receiver 18 is connected to the auto-que circuit 32 via line 34 and via line 36 to an MRE/mobile interface and control circuits unit 38. Upon receipt of a control signal on line 40 from the auto-que circuit 32, the PTT line 42 controlling the mobile transmitter is actuated and audio is applied thereto on line 44. The auto-que circuit 32, shown in greater detail in FIG. 3, is a logic circuit which automatically provides control signals to either of the two interface circuits 26 and 38 in order to establish a base station to portable station link or a portable station to base station link, respectively, depending on the input conditions to the auto-que circuit. Thus, in order to actuate interface 26 to establish the base/portable link, a signal from the base station must be continuously received subsequent to the simultaneous occurrence of a signal occurring a random time after the initiation of the base station signal and the absence of a signal from a portable station or another MRE transmitter within range. Conversely, the auto-que circuit automatically actuates interface 38 to establish a portable station to base station link when a signal from the portable station is continuously received subsequent to the simultaneous occurrence of a signal occurring a random time after the initiation of the portable station signal and the absence of a signal from a base station or another mobile station within range. Further details of the auto-que circuit are set forth in the discussion of FIGS. 2 and 3. Thus a communications link from the portable transceiver 20 to the base station is completed.

A more detailed block diagram of the mobile radio extension unit 14 is shown in FIG. 2. A line 46 from the discriminator of the mobile receiver 10 is applied to the mobile/MRE interface 48 that includes a de-emphasis network, high pass filter and amplifier for providing the proper level audio input to the MRE transmitter 16. A carrier detector 50, which is a squelch detector in the case of an FM system, for example, determines when the mobile receiver is receiving a signal. It will be apparent that other types of detectors may be used depending on the type of modulation employed. The presence of a carrier results in a control signal of a given sense, which may also be referred to as a "transmission request" or "keying" signal indicating that the base station 2 is attempting to seize the repeater on line 52 to the auto-que circuit. When certain conditions are met, as described below, the auto-que circuit 32 provides a control signal of one sense on line 36 that actuates the transmit/receive (T/R) relay and transmitter (X*mtr*) control 37 that in turn connects the MRE antenna 23 to the MRE transmitter 16 output and actuates the MRE transmitter.

In its unactuated state the MRE transmit/receive (T/R) relay 54 passes received signals from portable transceivers or other MRE transmitters within range at the antenna 23 to the MRE receiver 18. The portable transceiver 20 is equipped to continuously transmit a characteristic signal such as a subaudible tone, 100 cycles per second, for example, when the operator intends to form a link to the base station. The tone is not transmitted when the operator intends to communicate only with another portable transceiver. Thus when the portable transceiver 20 is transmitting a tone, the audio from that transceiver plus the tone are present on line 56 from the MRE receiver 18. Line 56 is applied to a tone detector 58 and to a tone rejection filter 60. When the tone is present, the detector 58 provides a control signal of one sense on line 62 to the auto-que circuit 32. The tone rejection filter removes the tone and provides audio only on line 64 to the MRE/mobile interface 66. The interface 66 includes a push-to-talk relay and relay driver that is actuated by a control signal on line 40 to actuate the mobile transmitter and apply the audio signal upon control of the auto-que circuit. A carrier detector 68, similar to detector 50, provides a control signal of one sense on line 70 to the auto-que circuit 32 when a signal is received by the MRE receiver 18. The presence of the control signal on line 62 may be referred to as a "transmission request" or "keying" signal indicating that a portable transceiver 20 is attempting to seize the repeater.

In FIG. 3 details of the auto-que circuit are shown as a plurality of NAND gates 72, 74, 76, 78, 80 and 82, an OR gate 84 and a sampling generator 86. Generator 86 repetitively provides a gating pulse of a given length. For example, it may provide a ten millisecond pulse every 300 milliseconds. The exact timing of the pulse repetition or length is not critical.

Referring first to the details of the gate interconnections, input line 52 from the mobile receiver carrier detector 50 is connected to one input 74–2 of gate 74 and to one input 78–1 of gate 78. Input line 70 from MRE carrier detector 68 is applied to one input 84–1 of gate 84. Input line 62 from tone detector 58 is applied to the other input 84–2 of gate 84 and to an input 80–2 of gate 80.

The sampling generator 86 output is applied to inputs 76–1 and 82–1 of gates 76 and 82, respectively. The output 76–3 of gate 76 is applied to input 74–3 of gate 74. The output 74–4 of gate 74 is brought back as the other input 76–2 of gate 76. Output 74–4 is also applied to line 36 as the control for the T/R relay and transmitter control 37 and is further applied to input 72–2 of gate 72. The other input 72–1 is received from output 84–3 of gate 84. Output 72–3 of gate 72 provides the remaining input 74–1 of gate 74.

The output 82–3 of gate 82 is applied to input 80–3 of gate 80 that has its output 80–4 brought back to input 82–2 of gate 82. Output 80–4 also is connected to line 40 for controlling the MRE/mobile interface 66. The output 80–4 is further applied to input 78–2 of gate 78. Output 78–3 is applied to the other remaining input 80–1 of gate 80.

For the particular logic circuit shown, a high signal or logic "1" on input lines 52, 62 or 70 is considered a request and the sampling generator 86 output is normally high or "1" except that when a pulse occurs it falls to "0." It will be apparent to those of ordinary skill in the art that other logic arrangements are possible that will meet the system requirements.

In the absence of a "1" on lines 52, 62 or 70, the occurrence of a sampling pulse causes no change in outputs 36 and 40, which are normally a "1." Conversely, a "1" on lines 52, 62 or 70 causes no change in the outputs 36 or 40 unless the input "1" occurs during a clock pulse.

The initial conditions of the circuit are as follows:

| | |
|---|---|
| 52, 74–2, 78–1 | 0 |
| 62, 84–2, 80–2 | 0 |
| 70, 84–1 | 0 |
| 84–3, 72–1 | 0 |
| 76–1, 82–1 | 1 |
| 76–3, 74–3 | 0 |
| 36, 74–4, 72–2, 76–2 | 1 |
| 72–3, 74–1 | 1 |
| 82–3, 80–3 | 0 |
| 40, 80–4, 78–2, 82–2 | 1 |
| 78–3, 80–1 | 1 |

Assume that line 52 goes to "1," indicating the detection of a carrier at the mobile receiver (from the base station). A "1" on line 52 constitutes a "transmission request" or "keying" signal indicating that the base station 2 is attempting to seize the repeater. Output 74–4 does not change due to the "0" at 74–3. Output 78–3 goes to "0," 80–4 does not change due to "0" on 80–3. Lines 36 and 40 remain unchanged. If line 52 remains "1" and the sample generator goes to "0," 74–4 will go to "0" providing a control signal on line 36 to actuate the T/R relay and transmitter control 37 thus causing the MRE transmitter 16 to be connected to antenna 23 to transmit. So long as a "1" remains present on line 52 line 36 will remain keyed ("0"), inputs 62 and 70 may assume any value, and line 40 will remain a "1." When line 52 returns to "0", the circuit will return to its initial condition.

Assume now that line 62 goes to "1" indicating the detection of a tone by tone detector 58. A "1" on line 62 constitutes a "transmission request" or "keying" signal indicating that a portable station 20 is attempting to seize the repeater. Ordinarily line 70 will simultaneously go to "1" since only a circuit malfunction could produce a tone detection indication in the absence of a carrier detection. Lines 62 and 70 are "OR*ed*" together by gate 84. Since the circuit is symmetrical a similar pattern of change occurs as described above. No change occurs in output lines 36 or 40 until a sampling pulse occurs; then if line 62 is still a "1," output line 40 is keyed (goes to "0") and line 36 is locked to "1." Input lines 52 and 70 may take on any value. Line 40 remains keyed until line 62 returns to "0."

Assume now that only line 70 goes to "1." In this case output line 36 is immediately inhibited from being keyed since 72–3 and 74–1 are held to "0."

Figure 4:
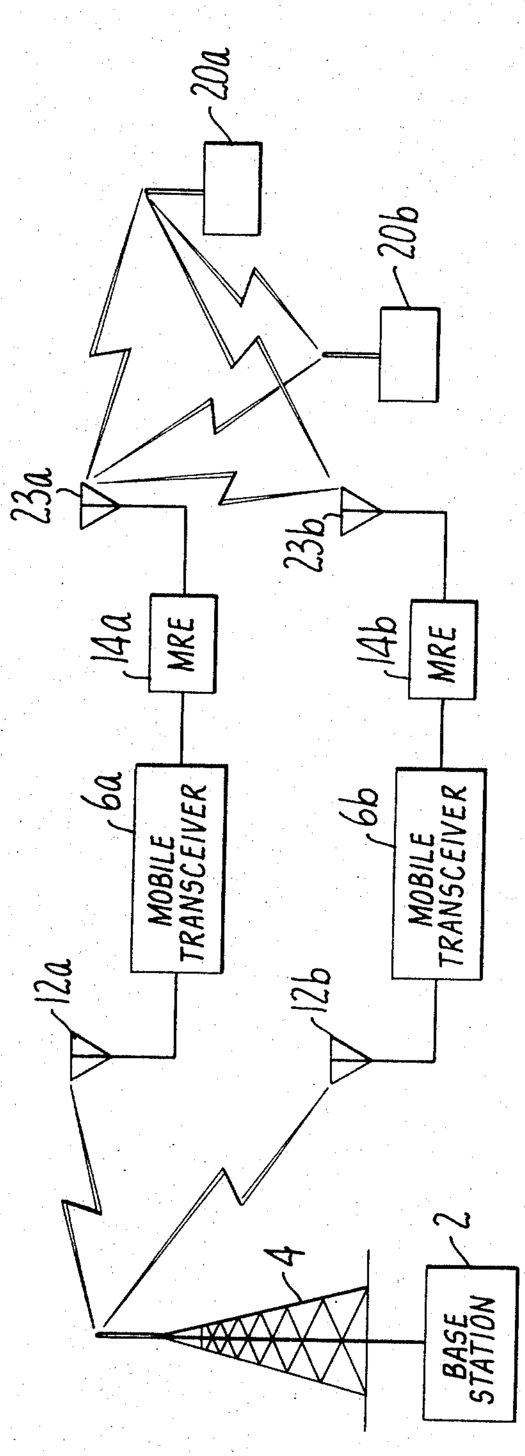
FIG. 4 is a block diagram showing multiple stations, which is useful in understanding the invention.
Figure 5:
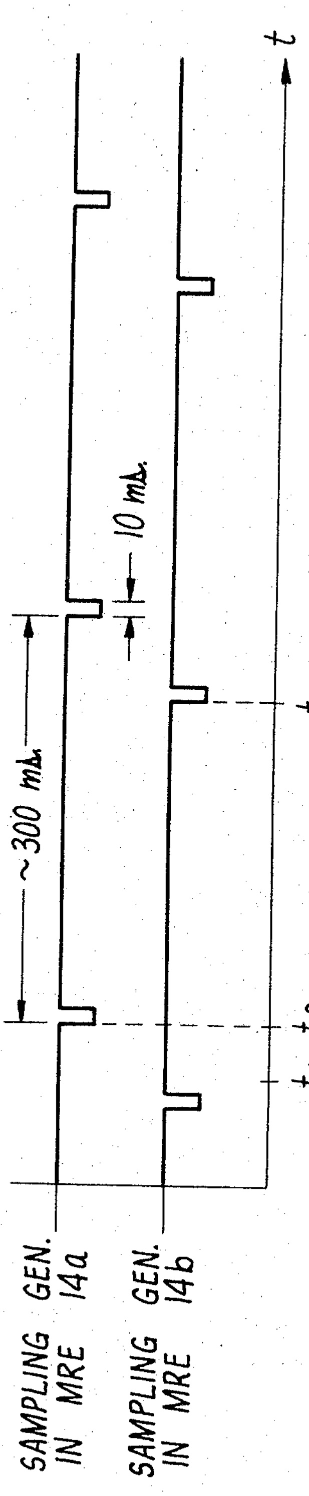
FIG. 5 is a timing diagram of the clock generators in a pair of mobile radio extension units.

Referring now especially to FIGS. 4 and 5, the operation of the system will be described with occasional references to FIGS. 1–3. In FIG. 4 a single base station and antenna 4 is shown that can communicate with two mobile transceivers **6*a* and 6*b* having antennas 12*a* and 12*b*, respectively. Each transceiver is connected to an MRE unit 14*a* and 14*b*, respectively, which have antennas 23*a* and 23*b*. Two portable transceivers 20*a* and 20*b* are shown. It is assumed that both the MRE transmitters and receivers and both portable transceivers are within range of one another. FIG. 5 shows the timing relationship of the pulses generated by the sampling generators 86 in each MRE unit 14*a* and 14*b*** that act essentially as random delays. Since the generators are not in synchronization and their periods may vary over certain limits, it is highly unlikely statistically that the pulses in any two MRE units will occur simultaneously and should this occur once the succeeding pulses will tend to drift apart.

Assume first that the base station desires to transmit to all portable transceivers in the network at time $t_1$. In order to do so the base station signal on a frequency $f_1$ must be received by each mobile receiver and repeated by each MRE transmitter on a frequency $f_2$ for reception by the receiver portion of each portable transceiver. However, where two or more MRE units are within range of each other only one unit should be triggered so that no interference is caused. Even though all the MRE units are nominally on the same frequency $f_2$ slight differences in frequency occur which can cause severe interference in some cases, especially if amplitude modulation is being used.

The presence of the base station signal results in an output from carrier detector 50 (FIGS. 2, 3) to provide a signal on line 52 to the auto-que circuit. The signal on line 52 is thus a "transmission request" or "keying" signal. This occurs in both MRE units **14*a* and 14*b*. At time $t_2$ a sampling pulse occurs in MRE unit 14*a* thus keying line 36 and activating the MRE transmitter in unit 14*a* and causing it to repeat the signal from the base station for reception by portable units 20*a*** and 20$b$. MRE unit 14$b$ then has not only a signal on line 52 from its mobile receiver carrier detector but it also has a signal on line 70 from its MRE carrier detector because the nearby MRE 14$a$ signal is being transmitted. The signal on line 70 in MRE 14$b$ inhibits the line 52 signal from keying the MRE 14$b$ transmitter at time $t_3$. Thus only one MRE unit transmits among a group of MRE units within the range of each other. The determination of which unit to transmit is automatic and random depending on the relative clock pulse locations in the MRE units. So long as the base station continues to transmit all other MRE units within range of unit 14$a$ will be inhibited. Likewise, a transceiver within range, such as 20$a$ or 20$b$ cannot seize control of MRE unit 14$a$ or any other MRE unit within range.

Assume now that a portable transceiver, such as 20$a$ or 20$b$, wishes to transmit to the base station 2. In this mode the portable transceiver's carrier continuously has a subaudible tone, 100 cycles per second, for example. The exact nature of the tone is not critical; it can be any identifiable characteristic of the signal that preferably can be separated from the audio or information content. If the portable transceiver is actuated at time $t_1$ it will cause a signal on lines 62 and 70 of each MRE unit 14$a$ and 14$b$ indicating detection of a carrier and a tone. The tone signal on line 62 is a "transmission request" or "keying" signal. At time $t_2$ a signal occurs on line 40 in MRE 14$a$ to its MRE/mobile interface to thereby activate the mobile transceiver's transmitter and repeat the portable transceiver's signal to the base station. MRE unit 14$b$ then also has a signal on line 52 indicating detection of a carrier by the mobile receiver; that signal inhibits unit 14 $b$ from activating mobile transceiver 6$b$ at time $t_3$.

A third mode of operation is direct portable transceiver to portable transceiver communication on frequency $f_2$ (simplex). In that case it is not desired that any MRE units be seized. Thus, by closing a switch, for example, the tone is removed. The result is that each MRE unit in range has a signal on line 70 from its carrier detector but no signal on line 62 from its tone detector. This causes the MRE transmitter from being seized by the base station and hence prevents any MRE transmitter in range from interfering with a portable station.

Since the time period between sampling pulses is so short the probability of receiving a request from the base station and from a portable station in an interval such as $t_1$–$t_2$ is extremely small and may be ignored.

It will be apparent that the principles of the MRE unit described herein are applicable to other communications network configurations. For example in the case of automatic stations sharing a common channel if several stations are given a command to transmit at time $t_1$ they cannot transmit until their internal sampling pulse occurs. Thus only one will transmit first and will inhibit the other stations.

As mentioned before, the system is not limited to any particular type of modulation, nor does each portion of the system need to use the same type of modulation. Thus the base station and mobile transceivers could use frequency modulation while the MRE and portable transceivers use amplitude modulation. Also, while each portion of the system is described as using the same frequency it will be apparent to those of ordinary skill in the art that split transmitting and receiving frequencies could be used although more equipment would be required at a greater cost.

In one typical practical embodiment of the system, the base station can be a police or fire department dispatcher. The mobile transceiver can be a conventional unit located in a police or fire vehicle. The mobile radio extension unit is likewise located in the vehicle and connects to the mobile transceiver: none of the normal functions of the mobile transceivers are impaired. The portable transceiver can then be used by an officer when away from his vehicle. Since it need only send and receive to the nearby MRE unit it can be small and lightweight.

I claim:

1. Apparatus connectable to a first transmitter and a first receiver for converting said first transmitter and first receiver for use as a repeater in response to a signal from a station attempting to seize the repeater comprising second receiver means for receiving a signal on a frequency different from the receiving frequency of said first receiver, interfacing means responsive to a control signal for interfacing said first transmitter and said second receiver means and for energizing said first transmitter, first detector means connected to said first receiver for providing a first signal when a signal is received by said first receiver, first transmitter keying means connected to said second receiver means for providing a first transmitter keying signal in response to said signal from a station attempting to seize the repeater received by said second receiver, means for generating a signal occurring a random time after said first transmitter keying signal, and control signal generating means connected to said first detector means, said first transmitter keying means, said delay signal means and said interfacing means for continuously applying a control signal to said interfacing means during the presence of said first transmitter keying signal subsequent to the coincidence in said control signal generator means of said first transmitter keying signal and said delay signal in the absence of said first signal whereby signals received by said second receiver means are repeated by said first transmitter.

2. Apparatus according to claim 1 wherein said first transmitter requesting means comprises second detector means connected to said second receiver means for generating said first transmitter keying signal when said second receiver is receiving said signal.

3. Apparatus according to claim 2 wherein said second detector means generates a first transmitter keying signal only when the signal received by said second receiver has a predetermined characteristic.

4. Apparatus according to claim 1 wherein said delay signal comprises a repetitively occurring clock signal.

5. Apparatus according to claim 2 wherein said delay signal comprises a repetitively occurring clock signal.

6. Apparatus according to claim 3 wherein said delay signal comprises a repetitively occurring clock signal.

7. Apparatus according to claim 1 further comprising second transmitter means for transmitting a signal on a frequency different from the frequency of said first transmitter, further interfacing means responsive to a control signal for interfacing said first receiver and said second transmitter means and for energizing said second transmitter, and wherein said control signal generating means is also connected to said further interfacing means for continuously applying a control signal to said further interfacing means during the presence of said first signal subsequent to the coincidence in said control signal generating means of said first signal and said delay signal in the absence of said first transmitter keying signal whereby signals received by said first receiver are repeated by said second transmitter means.

8. Apparatus according to claim 7 wherein said delay signal comprises a repetitively occurring clock signal.

9. Apparatus according to claim 7 wherein said first detector means provides a first signal only when the signal received by said first receiver has a predetermined characteristic.

10. In a communication system of the type having a plurality of stations, each station including a transmitter and a receiver normally tuned to substantially the same frequency, with the receivers normally energized and the transmitters normally de-energized, and wherein the transmitters of at least two stations can be simultaneously energized to transmit in response to one or more control signals resulting in interference by the simultaneous transmission over the same frequency, apparatus for each station whereby simultaneous transmission of signals by two or more transmitters within reception range of each is inhibited comprising keying signal generating means for generating a keying signal in response to a control signal, means for generating a signal occurring a random time after said keying signal, means connected to a receiver at said one of said stations to provide a frequency-in-use signal when a signal is received by said receiver, and means receiving said delay signal, said keying signal and said frequency-in-use signal for energizing said transmitter when said keying signal and said delay signal coincide in the absence of said frequency-in-use signal.